*L. O. Luce,*

*Street Sprinkler.*

Nº 17,158.   Patented Apr. 28, 1857.

UNITED STATES PATENT OFFICE.

CURTIS O. LUCE, OF BRANDON, VERMONT.

IMPROVED STREET-SPRINKLER.

Specification forming part of Letters Patent No. 17,158, dated April 28, 1857.

*To all whom it may concern:*

Be it known that I, CURTIS O. LUCE, of Brandon, in the county of Rutland and State of Vermont, have invented a new and Improved Device for Sprinkling Streets; and I do hereby declare that the following is a full, clear, and exact description of the same, reference being had to the annexed drawings, making a part of this specification, in which—

Figure 1:
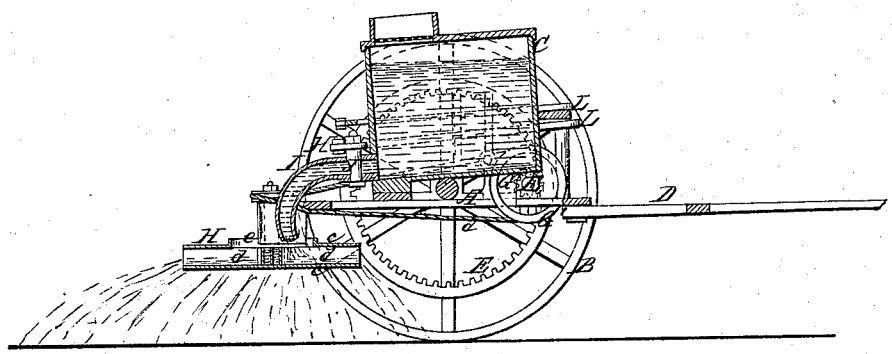
Figure 2:
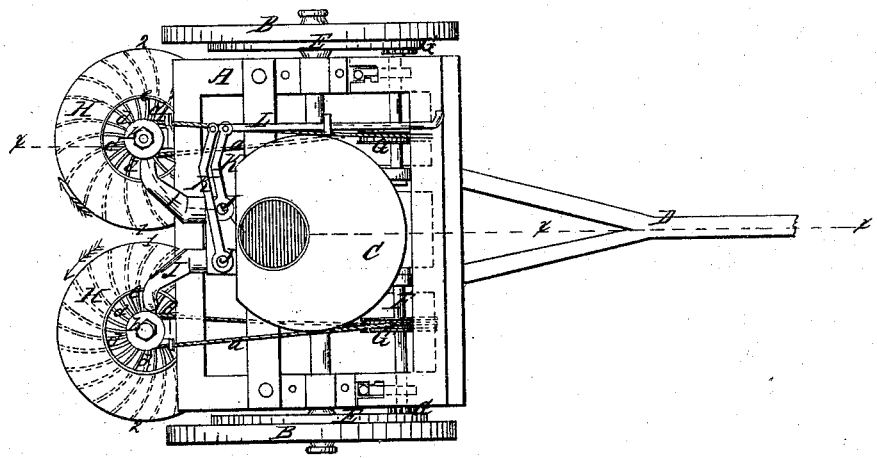

Figure 1 is a longitudinal vertical section of my improvement, $x\ x$, Fig. 2, showing the plane of section. Fig. 2 is a plan or top view of the same.

Similar letters of reference indicate corresponding parts in both figures.

My invention consists in the employment or use of two horizontal rotating wheels, which are driven from the wheels of the carriage, the horizontal wheels receiving the water from a reservoir or tank on the carriage. The water is distributed by means of the centrifugal force generated by the rotation of the horizontal wheels, and the supply of water to the wheels is regulated, as desired, by means of cocks placed in the tubes which convey the water from the tank to the wheels.

To enable others skilled in the art to fully understand and construct my invention, I will proceed to describe it.

A represents a framing, which is supported by two wheels B B, the framing and wheels forming a carriage on which a water tank or reservoir C is placed. D represents the draft-pole of the carriage. To the inner side of each wheel B a toothed wheel or rim E is attached concentric with the wheels B, and F is a shaft fitted in bearings on the framing A, said shaft having a pinion G at each end, which pinions gear into the toothed rims E. On the shaft F two pulleys G' G' are placed, said pulleys having belts $a$ passing around pulleys $b$ on the shafts or axes of two horizontal wheels H H, which are placed at the back of the framing A. The wheels H are formed each of two circular plates $c\ c$, having curved plates $d$ passing from near their centers to their outer edges, as shown plainly by the dotted lines in Fig. 2. From the lower part of the reservoir or tank C two pipes I I project. These pipes extend downward over apertures $e$, made through the centers of the upper plates $c$ of the wheels, the ends of the pipes being at the inner sides of the apertures, as shown in Fig. 2. In each pipe I a cock J is fitted, and to each cock a lever K is attached, arms L being connected to the levers, so that the cocks may be regulated by the driver and the wheels H supplied with a greater or less quantity of water, as desired. As the carriage is drawn along the two wheels H H are rotated in the direction indicated by the arrows, the wheels H being rotated from the wheels B by means of the gearing E G and pulleys G' $b$ and belts $a$. The water passes from the tank C through the pipes I into the wheels H, and is discharged therefrom by centrifugal force as the wheels pass from the points 1 to the points 2, as seen in Fig. 2, and the water will be evenly discharged or thrown from the wheel H and at a considerable distance, so that a medium-sized implement will be able to sprinkle a street of ordinary width by once passing along the center of it.

The ordinary street-sprinklers are merely perforated tubes attached to a pipe leading from a barrel placed on an ordinary cart. The water is forced through the tube by hydrostatic pressure merely, and consequently the water is not discharged far and does not, in fact, sprinkle a space much wider than the cart, and the cart is required to pass several times (generally four times) through a street in order to sprinkle water over its entire width. My improvement completely obviates this objection.

The machine may be cheaply constructed. The framing may be of wood or iron. Sheet metal or metal plate would probably be the most preferable material of which to construct the wheels H.

Having thus described my invention, what I claim as new, and desire to secure by Letters Patent, is—

The combination of the water-reservoir C, horizontal rotating discharging-wheels H H, operated from the wheels B B of the carriage, substantially as shown, and the conveying-pipes I I, provided with the cocks J J, the whole being arranged as shown, for the purpose set forth.

CURTIS O. LUCE.

Witnesses:
SELIM FRAS. COHEN,
JAMES F. BUCKLEY.